(12) United States Patent
Karapantelakis et al.

(10) Patent No.: US 11,824,952 B2
(45) Date of Patent: Nov. 21, 2023

(54) METHOD OF FILTERING DATA TRAFFIC SENT TO A USER DEVICE

(71) Applicant: Telefonaktiebolaget LM Ericsson (publ), Stockholm (SE)

(72) Inventors: Athanasios Karapantelakis, Solna (SE); Rafia Inam, Västerås (SE); Marin Orlic, Bromma (SE); Maxim Teslenko, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/924,834

(22) PCT Filed: May 15, 2020

(86) PCT No.: PCT/SE2020/050505
§ 371 (c)(1),
(2) Date: Nov. 11, 2022

(87) PCT Pub. No.: WO2021/230786
PCT Pub. Date: Nov. 18, 2021

(65) Prior Publication Data
US 2023/0216932 A1    Jul. 6, 2023

(51) Int. Cl.
*H04L 67/50* (2022.01)
*G06Q 30/0251* (2023.01)
*H04L 67/02* (2022.01)

(52) U.S. Cl.
CPC ....... *H04L 67/535* (2022.05); *G06Q 30/0267* (2013.01); *H04L 67/02* (2013.01)

(58) Field of Classification Search
CPC .......... H04L 67/02; H04L 67/535; G06Q 30/0251–0258; G06Q 30/0267–0271
See application file for complete search history.

(56) References Cited

U.S. PATENT DOCUMENTS 8,725,849 B1 * 5/2014 Lloyd ................. G06F 16/9574
                                                          709/227
10,497,011 B2 * 12/2019 Berkley ................. G06Q 30/02
(Continued)

FOREIGN PATENT DOCUMENTS

CN        103297498 A       9/2013
CN        104657428 A       5/2015
(Continued)

OTHER PUBLICATIONS

Author Unknown, "Mobile Vs. Desktop Internet Usage (Latest 2022 Data)", <https://www.broadbandsearch.net>, 2022, 1-7.
(Continued)

*Primary Examiner* — Jonathan A Bui
(74) *Attorney, Agent, or Firm* — Murphy, Bilak & Homiller, PLLC

(57) ABSTRACT

A user device is configured to receive Hypertext Transfer Protocol, HTTP, requests sent by a user of the device. Information is obtained from the received HTTP requests about areas of interest to the user. The information obtained from the received HTTP requests is combined to generate a machine-generated representation of the areas of interest to the user. Then, data traffic sent to the user is received, and is modified based on the machine-generated representation of the areas of interest to the user.

18 Claims, 13 Drawing Sheets

(56) References Cited

U.S. PATENT DOCUMENTS

| | | |
|---|---|---|
| 2008/0040225 A1 | 2/2008 | Roker |
| 2008/0306816 A1* | 12/2008 | Matthys ............. G06Q 30/0273 705/14.69 |
| 2008/0313336 A1* | 12/2008 | Porter .................... H04L 67/02 709/227 |
| 2009/0228357 A1* | 9/2009 | Turakhia ................ G06Q 30/02 726/5 |
| 2010/0030647 A1* | 2/2010 | Shahshahani .......... G06Q 30/02 705/14.66 |
| 2011/0093790 A1* | 4/2011 | Maczuba ............ G06F 16/9574 715/745 |
| 2012/0137201 A1 | 5/2012 | White et al. |
| 2013/0203433 A1 | 8/2013 | Luna et al. |
| 2013/0325603 A1* | 12/2013 | Shamir ............. G06Q 30/0254 705/14.52 |
| 2014/0372250 A1 | 12/2014 | Dugan |
| 2015/0135060 A1 | 5/2015 | Taylor et al. |
| 2019/0188323 A1* | 6/2019 | Ghosh .................... G06N 20/00 |
| 2019/0333162 A1* | 10/2019 | Wang ..................... G06N 20/20 |
| 2019/0340653 A1 | 11/2019 | Kumar et al. |
| 2019/0370231 A1 | 12/2019 | Riggs et al. |

FOREIGN PATENT DOCUMENTS

| | | |
|---|---|---|
| CN | 110795624 A | 2/2020 |
| JP | 2001142907 A | 5/2001 |
| WO | 2015002974 A1 | 1/2015 |
| WO | 2017019110 A1 | 2/2017 |
| WO | 2018176215 A1 | 10/2018 |

OTHER PUBLICATIONS

Author Unknown, "The Product Types Ontology: Class Definition for "USB flash drive"", E-Business and Web Science Research Group, <http://www.productontology.org/id/USB_flash_drive>, accessed May 2020, 1-5.

Author Unknown, "Visual Business Process Designer with advanced features", AppMaster, <https://appmaster.io/product/business-process-editor>, 2020, 1-15.

Author Unknown, "What is WordNet?", WordNet, A Lexical Database for English, <https://wordnet.princeton.edu/>, 2020, 1-2.

Haarman, Tim, et al., "Unsupervised Keyphrase Extraction for Web Pages", Multimodal Technologies and Interaction, vol. 3, No. 58, MDPI, Jul. 31, 2019, 1-12.

Skeldon, Paul, et al., "M-commerce accounts for 60% of total global ecommerce as it grows to$1.4tn in 2017", Archived article, <https://internetretailing.net>, Feb. 13, 2018, 1-6.

\* cited by examiner

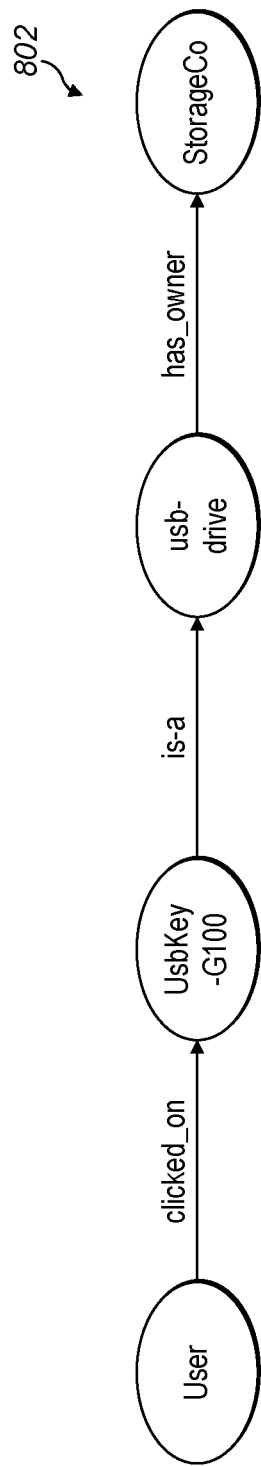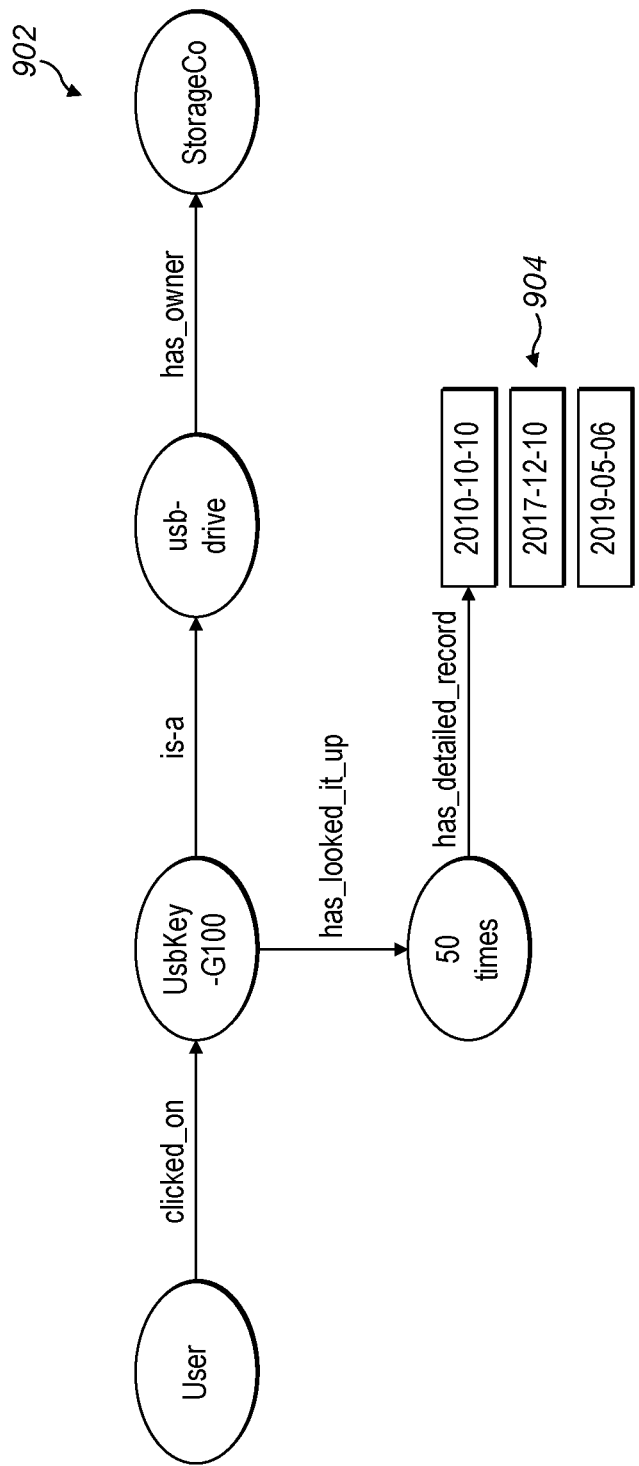
Figure 8
Figure 9

METHOD OF FILTERING DATA TRAFFIC SENT TO A USER DEVICE

TECHNICAL FIELD

Embodiments of the present disclosure relate to a method of operation of a user device, and in particular to a method of filtering data traffic sent to the user device.

BACKGROUND

When a user accesses the internet, for example using a device such as a smartphone, it is known to modify the data that is sent to the user, based on information about that user's preferences.

For example, advertisers try to understand user preferences by tracking their online behaviour. For example, online retailers use algorithms that recommend new purchases based on a user's history of purchases. Similarly, other algorithms may make use of the search history of the user to gauge an "interest" profile, which subsequently they use in order to provide content relevant to the user's interests.

One limitation of existing systems is that their recommendations are typically restricted to one administrative domain. For example, the website of one online retailer may make use of the actions of the user within that website, but will have no information about the user's behaviour in other websites.

Similarly, a search engine may process the search queries that a user makes, and display relevant advertisements and/or content in the search results. However, this means that any user interest that is not captured in the user's search queries (for example because a URL is directly accessed through a web browser, or because a hyperlink in a website is followed) is not considered.

In addition, tracking and disclosure of a user's activities by third parties may be considered an invasion of privacy.

SUMMARY

According to a first aspect, there is provided a method of operation of a user device. The method comprises, in the user device, receiving Hypertext Transfer Protocol, HTTP, requests sent by a user of the device. Information is obtained from the received HTTP requests about areas of interest to the user, and combined to generate a machine-generated representation of the areas of interest to the user. Data traffic sent to the user is received, and is modified, based on the machine-generated representation of the areas of interest to the user.

According to a second aspect, there is provided a user device, comprising a processor and a memory. The user device is configured to receive Hypertext Transfer Protocol, HTTP, requests sent by a user of the device, and to obtain information from the received HTTP requests about areas of interest to the user. The user device is further configured to combine the information obtained from the received HTTP requests to generate a machine-generated representation of the areas of interest to the user. When data traffic sent to the user is received, the user device is configured to modify the received data traffic, based on the machine-generated representation of the areas of interest to the user.

According to a third aspect, there is provided a computer program product, comprising instructions for causing a user device to perform a method comprising receiving Hypertext Transfer Protocol, HTTP, requests sent by a user of the device; obtaining information from the received HTTP requests about areas of interest to the user; and combining the information obtained from the received HTTP requests to generate a machine-generated representation of the areas of interest to the user. The method further comprises, when data traffic sent to the user is received, modifying the received data traffic, based on the machine-generated representation of the areas of interest to the user.

This has the advantage that the method can work across administrative domains, capturing user behavior across their browsing sessions, and therefore provide filtering of data traffic that better reflects the interests of the user.

In addition, the method can work in private, operating exclusively on the device that the user uses for browsing, and therefore reduces any privacy concerns, because the combined data is not shared with third parties.

Thus, the user is presented with information that is more relevant to their interests.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 8 illustrates a part of the method of FIG. 4 in one embodiment;

FIG. 9 illustrates a part of the method of FIG. 4 in another embodiment;

DETAILED DESCRIPTION

Figure 1:
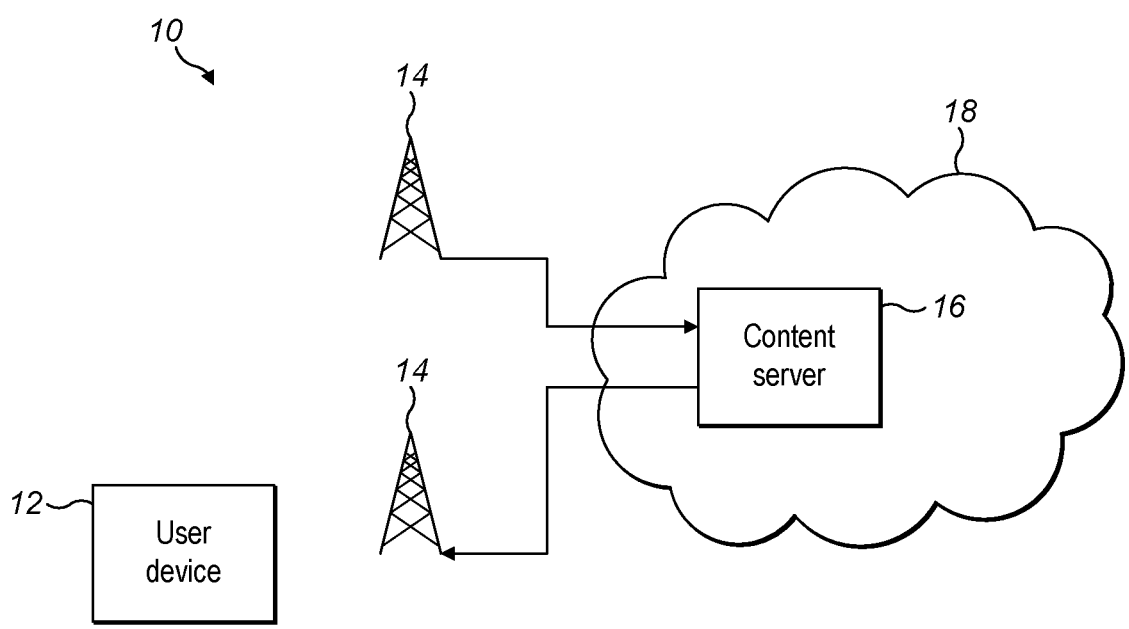
FIG. 1 illustrates a part of a telecommunications network, in which the method may be used.

FIG. 1 illustrates a part of a telecommunications network 10, in which the method disclosed herein may be used.

Specifically, FIG. 1 shows a user device 12, which in this embodiment is a wireless device that is able to connect to the internet via a radio base station 14, and hence connect to devices such as a content server 16 on the internet 18.

The user device 12 may for example be a smartphone with the ability to connect to the internet over a cellular wireless link as shown in FIG. 1. In other embodiments, the user device 12 may be a laptop or tablet computer, which may have a short-range wireless connection, but that is typically connected to the internet over a wired connection. In practice, the user device 12 may be any computing device.

Figure 2:
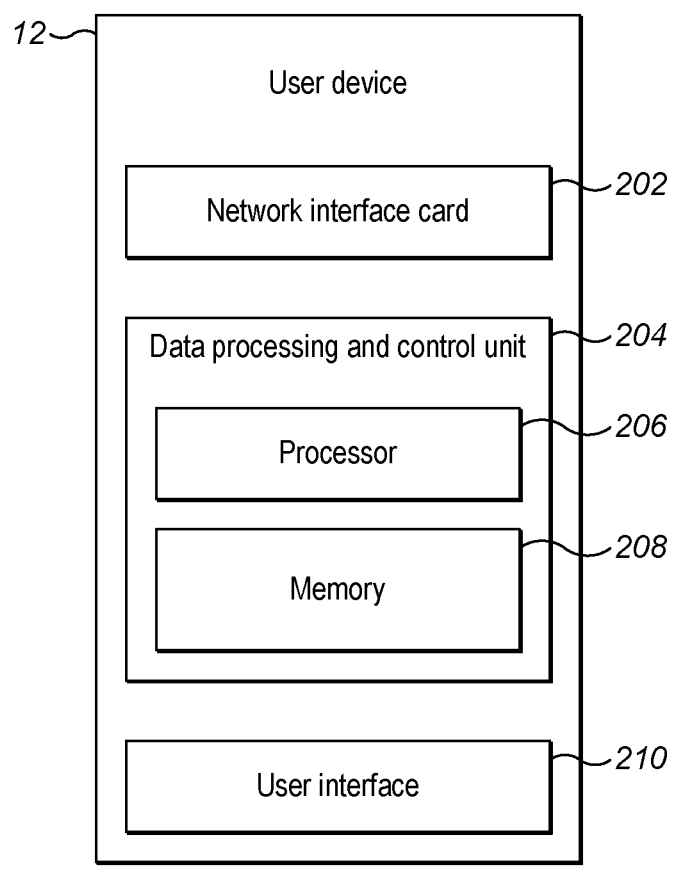
FIG. 2 illustrates a form of a user device from a functional perspective.

FIG. 2 illustrates a form of a user device from a structural perspective.

It will be appreciated that the user device 12 may take any convenient form, and will typically have many more components than are shown in FIG. 2, but FIG. 2 is sufficient for an understanding of the present invention.

Thus, the user device 12 shown in FIG. 2 has a network interface card 202, configured to allow the user device 12 to communicate over a wired or wireless network with other devices, The user device 12 also includes a data processing and control unit 204, which includes a processor 206 and a memory 208. The processor is configured to perform method steps as described here, on the basis of data and program instructions stored in the memory 208.

The user device 12 also has a user interface 210, for receiving user inputs and for presenting information to the user. For example, the user interface 210 may include a display, and the display may be a touch screen display allowing the user to provide inputs through the display. Alternatively, or additionally, the user interface 210 may include a keypad allowing the user to provide inputs.

Figure 3:
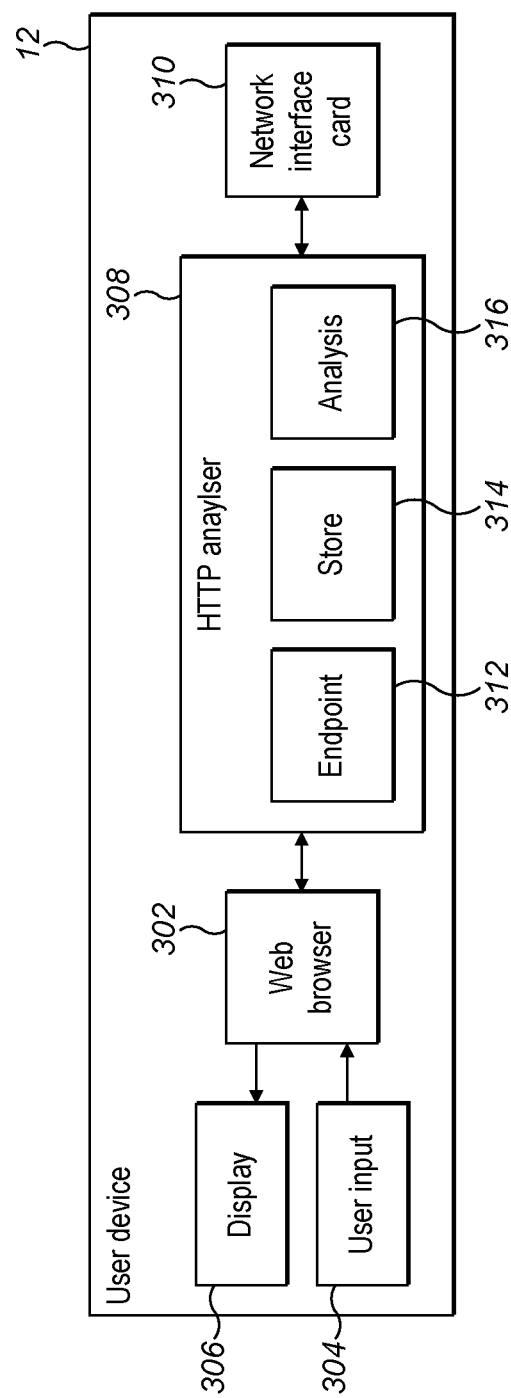
FIG. 3 illustrates a form of the user device, from a structural perspective.

FIG. 3 illustrates a form of the user device 12, from a functional perspective.

Specifically, FIG. 3 shows elements of the user device 12 that are involved in the methods described herein.

More specifically, FIG. 3 shows the user device 12 having a web browser 302, which is a software application for accessing information on the World Wide Web.

As is conventional, a user may request a particular website by means of a user input 304, which may take the form of a touch screen, voice input, keyboard, or any other suitable input. On receipt of the request, the web browser 302 retrieves the necessary content from a web server, for example the content server 16 as shown in FIG. 1. The web browser 302 then conventionally outputs the relevant information to the user, for example by display the resulting web page on the display 306 of the user's device, or by providing a voice output.

FIG. 3 also shows that, for the purposes of the method disclosed herein, the user device 12 also includes an HTTP Analyser (HA) 308, which is a logical component that acts as a proxy between the web browser 302 and the Network Interface Card (NIC) 310 of the device.

The HTTP Analyser (HA) 308 is typically built in software and consists of a number of logical elements.

An HA Endpoint 312 is responsible for intercepting HTTP Requests from the web browser 302 and HTTP responses directed to the web browser 302. As described in more detail below, it stores data contained in the HTTP Requests to an HA Store 314, and processes the content of HTTP Responses to those requests before forwarding it to the web browser 302.

The HA Store 314 stores relevant information from HTTP Requests, timestamped based on the time of their arrival. Depending on the technique used for user relevance analysis, the HA Store 314 can either be a graph database, or a relational/document database. It is also possible, depending on the implementation, for the HA Store 314 to be implemented in volatile memory, e.g. Random-Access Memory (RAM) of the device 12.

The HTTP Analyser 308 also includes an HA Analysis unit 316, which, depending on the technique used for inferring user relevance, either periodically trains a machine learning model with new data or updates a knowledge graph. This is described in more detail later.

Figure 4:
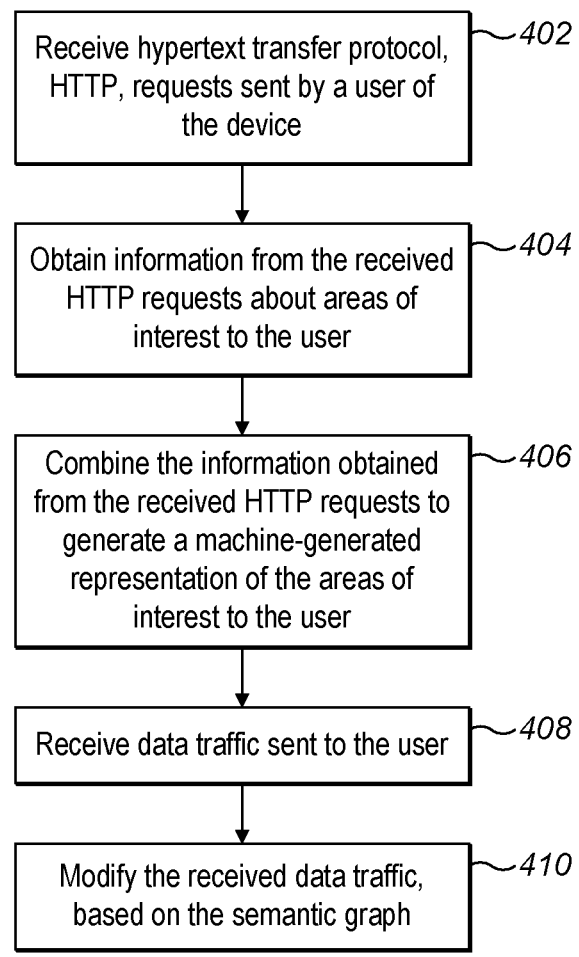
FIG. 4 illustrates a method according to one embodiment.

FIG. 4 illustrates a method of operation of a user device, such as the user device 12, according to one embodiment.

The method comprises, in the user device, at step 402, receiving Hypertext Transfer Protocol, HTTP, requests sent by a user of the device.

At step 404, the method comprises obtaining information from the received HTTP requests about areas of interest to the user, or areas that the user reads preferentially.

For example, the information about areas of interest to the user may be obtained from a message header of a received HTTP request. More specifically, the information about areas of interest to the user may be obtained from a Uniform Resource Identifier specified in the message header of the received HTTP request.

As another example, the information about areas of interest to the user may be obtained from a Hypertext Markup Language, HTML, description of a resource identified by a Uniform Resource Identifier identified in the message header of a received HTTP request.

At step 406, the method comprises combining the information obtained from the received HTTP requests to generate a machine-generated representation of the areas of interest to the user, or the user's preferences.

The machine-generated representation may be a semantic graph.

The semantic graph may describe hierarchical relationships.

The semantic graph may contain information identifying user actions that triggered the HTTP requests.

The semantic graph may be updated with information relating to a history of said HTTP requests.

The semantic graph may allow an inference that information is no longer relevant to an area of interest of the user.

The semantic graph may be updated with information obtained from external reference sources, relating to said information obtained from the received HTTP requests.

The semantic graph may be generated based on machine learning.

Alternatively, the machine-generated representation may be a machine learning model that is trained by classifying the machine learning model based on the obtained information about areas of interest to the user.

The machine learning model may be a feedforward neural network model.

Data traffic sent to the user, for example data sent from a resource identified in an HTTP request, such as data representing the contents of a web page or the like, in response to an HTTP request sent by the user, is received in step 408 of the method. In step 410, the received data traffic is modified, for example filtered, based on the semantic graph.

The step of modifying the received data traffic may comprise modifying the received data traffic in such a way that information relevant to an area of interest of the user is highlighted when the data traffic is presented to the user by a web browser.

Alternatively, or additionally, the step of modifying the received data traffic may comprise modifying the received data traffic in such a way that information that is not relevant to an area of interest of the user is removed when the data traffic is presented to the user by a web browser.

Alternatively, or additionally, the step of modifying the received data traffic may comprise modifying the received data traffic in such a way that information contained in the data traffic is replaced by information relevant to an area of interest of the user when the data traffic is presented to the user by a web browser.

Figure 5:
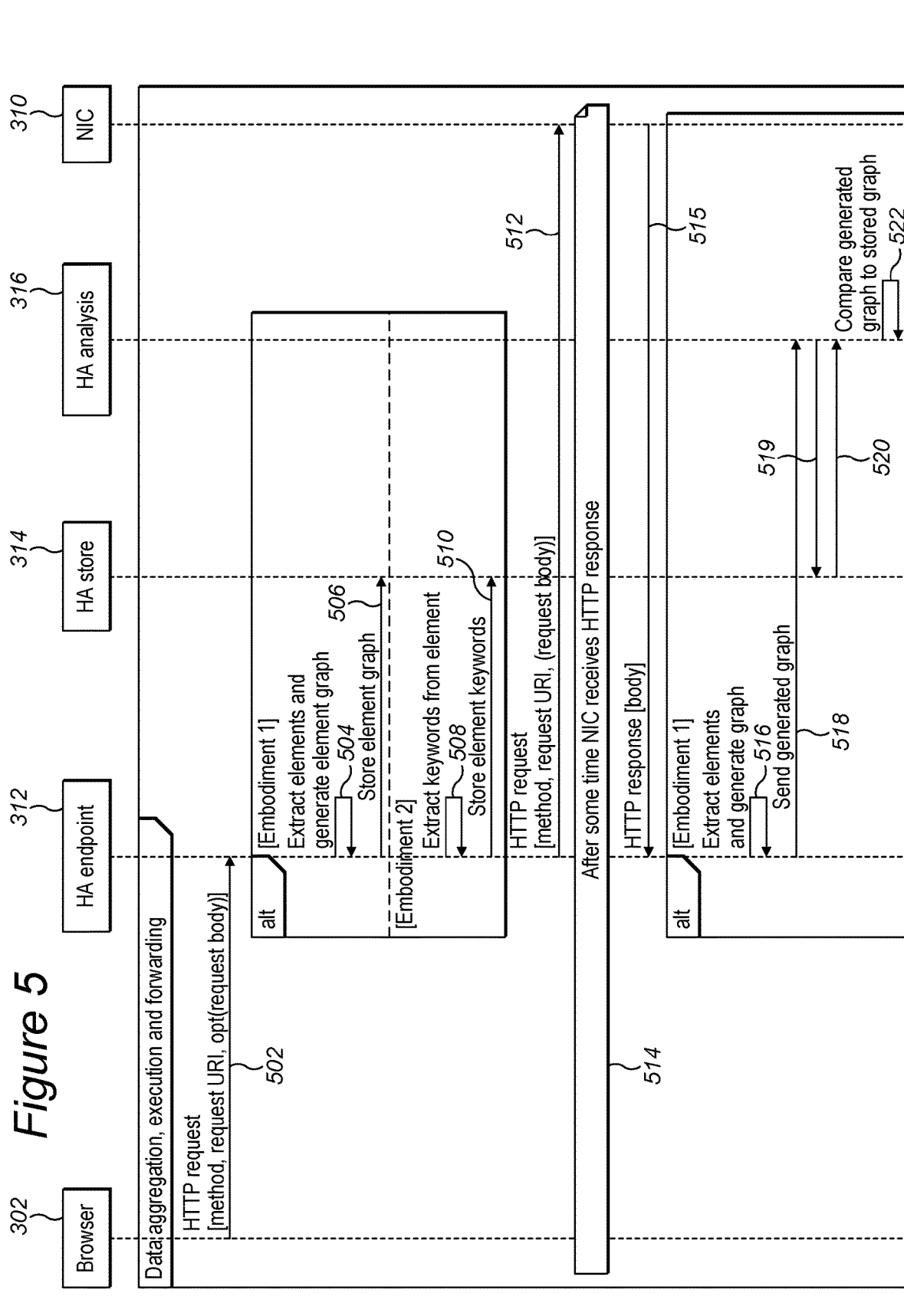
FIG. 5 illustrates in more detail methods according to certain embodiments.
Figure 5:
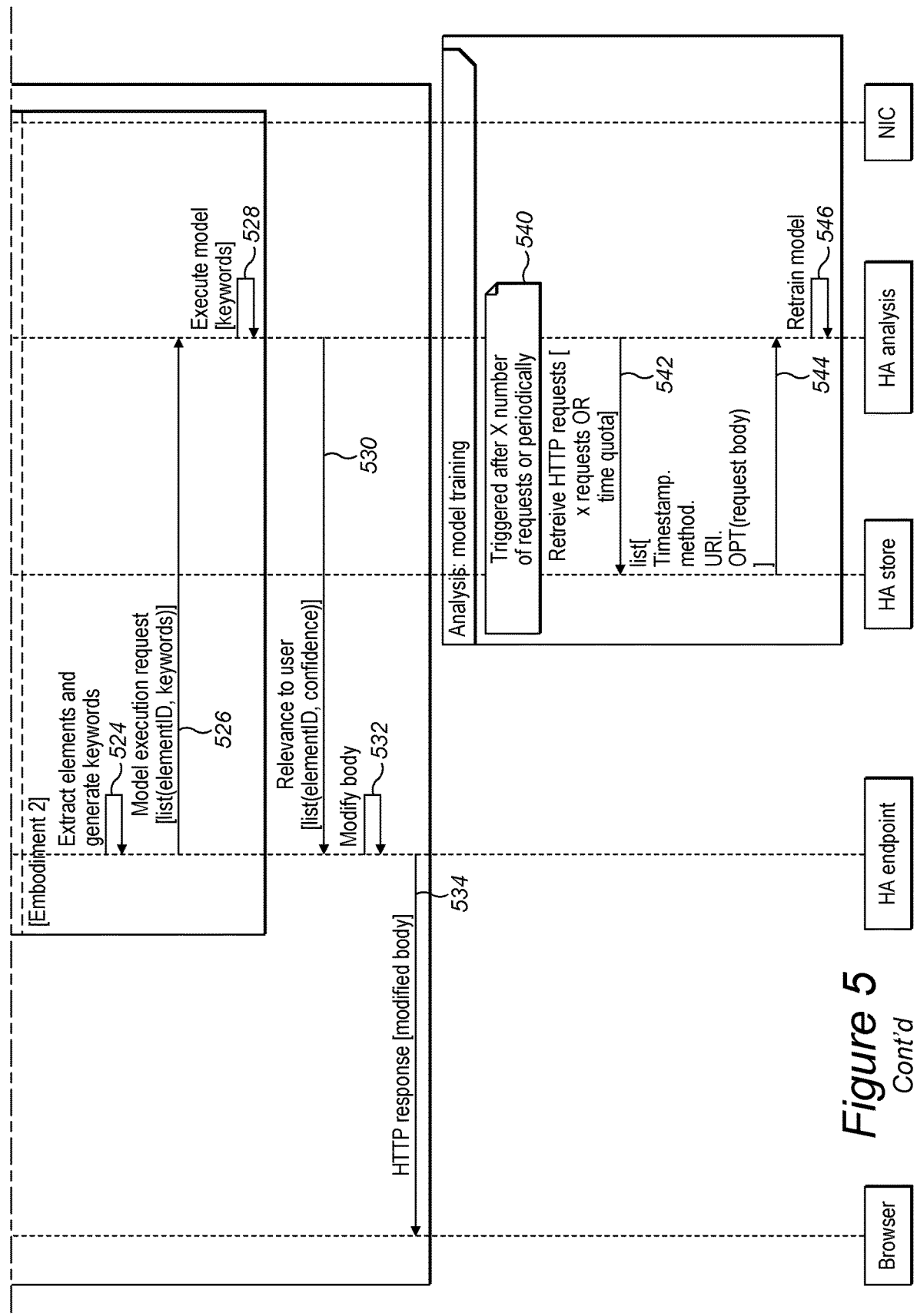

FIG. 5 illustrates in more detail methods according to certain embodiments.

As described above with reference to FIG. 4, the method disclosed herein may involve generating a machine-generated representation of the areas of interest to the user, or the user's preferences. In some embodiments, the machine-generated representation comprises a semantic graph, which can be stored. In such embodiments, referred to as Embodiment 1 in connection with FIG. 5, the filtering of the received data traffic, based on the semantic graph, can be done by means of a direct comparison with the graph. In other embodiments, referred to as Embodiment 2 in connection with FIG. 5, the machine-generated representation comprises a machine learning (ML) model, which can be trained with message headers of received HTTP requests as input, and outputting the areas of interest to the user as outputs. For example, a Convolutional Neural Network (CNN) may be used, as it is known that a CNN may be used for text classification.

FIG. 5 illustrates embodiments in which the filtering is done by means of a direct comparison with the semantic graph and embodiments in which a machine learning model is used.

FIG. 5 illustrates steps performed by the web browser 302, the HTTP Analyser (HA) Endpoint 312, the HA Store 314, the HA Analysis unit 316, and the Network Interface Card (NIC) 310 of the user device 12.

The method begins when, in response to a user input, the web browser 302 generates a Hypertext Transfer Protocol, HTTP, request 502, which may for example contain a Uniform Resource Identifier (URI) specified in the message header of the received HTTP request.

The process performed at this stage depends on whether the filtering is done by means of a direct comparison with the graph (Embodiment 1), or whether a machine learning model is used (Embodiment 2).

In Embodiment 1, at step 504, the HA Endpoint 312 extracts elements from the HTTP request 502. At step 506, the HA Endpoint 312 stores an element graph in the HA Store 314.

In Embodiment 2, at step 508, the HA Endpoint 312 extracts keywords from the HTTP request 502. At step 510, the HA Endpoint 312 stores the element keywords in the HA Store 314.

In Embodiment 1 and Embodiment 2, at 512, the HA Endpoint 312 forwards the HTTP request to the Network Interface Card (NIC) 310, which directs it to the correct resource, in a conventional way.

After an interval, at 514, the NIC 310 receives an HTTP Response in a conventional way, and, at step 515, directs this towards the web browser 302.

Again, the process performed at this stage depends on whether the filtering is done by means of a direct comparison with the graph (Embodiment 1), or whether a machine learning model is used (Embodiment 2).

In Embodiment 1, the HA Endpoint 312 intercepts the HTTP response and, at 516, extracts relevant elements from the HTTP response and generates a graph.

At step 518, the HA Endpoint 312 sends the generated graph to the HA Analysis unit 316.

At step 519, the HA Analysis unit 316 also sends a request to retrieve the stored graph from the HA Store 314, and the HA Store sends the stored graph to the HA Analysis unit in step 520.

At step 522, the HA Analysis unit 316 compares the most recently generated graph to the stored graph that it retrieved from the HA Store 314.

In Embodiment 2, the HA Endpoint 312 intercepts the HTTP response and, at 524, extracts relevant elements from the HTTP response and generates keyword.

At step 526, the HA Endpoint 312 sends a model execution request to the HA Analysis unit 316, including the extracted keywords.

At step 528, the HA Analysis unit 316 executes the model on the basis of the received keywords.

In Embodiment 1 and Embodiment 2, at 530, the HA Analysis unit 316 sends information to the HA Endpoint 312 about the relevance to the user of the received data traffic that is being sent towards the user. The HA Analysis unit 316 also includes a measure of its confidence in the information sent to the HA Endpoint 312 about the relevance.

At step 532, the HA Endpoint 312 filters the data traffic, by modifying its content, as described in more detail below.

At step 534, the HA Endpoint 312 sends the filtered data traffic to the web browser 302, which will present the data to the user interface in a form that allows it to be presented to the user.

In the case of Embodiment 2, where machine learning is used, the model that is used initially may be trained using training data generated specifically for that purpose. However, the model may be further trained while the system is in use, based on the actual HTTP requests sent by the user of the device, in order to identify whether part of the content sent towards the browser is relevant to the user or not.

As shown at step 540 in FIG. 5, re-training of the model may be triggered after a predetermined number of HTTP requests have been intercepted by the HA Endpoint 312. For example, re-training of the model may be triggered after every 200 HTTP requests.) Alternatively, the training can also take place periodically, e.g. every day.

In either case, when the re-training criterion is met, at step 542, the HA Analysis element 316 requests data relating to recent HTTP requests from the HA Store element 314. At step 544, the HA Store element 314 sends the data relating to recent HTTP requests, including the contents of those requests, and the timestamps associated with each request, to the HA Analysis element 316.

At step 546, the HA Analysis re-trains the model that is executed in step 528.

The step of combining information obtained from the received HTTP requests, in order to generate a semantic graph representing the areas of interest to the user, is now described in more detail.

This involves keyword extraction and creation of a symbolic representation. The specific symbolic representation used in certain embodiments is a graph, and specifically a semantic network, a format which is commonly used in artificial intelligence (AI) for representing knowledge, which is easily readable and processable by machines. A key part of semantic network graphs is the portrayal of relationships between entities.

These relationships semantically represent the relationship of one entity to another. In the content of the methods described herein, the task is to extract the relationship between the user entity (that is, the person operating the user device), and the entity that the user is interested in. This entity could be, for example a product, a company or organization or private individual, or a hobby or interest, etc. Using information obtained from the web browser 302, the relationship can be described as "clicked on" or "searched for".

From a linguistics perspective, the "relationship" is defined as the "verb" part of the relationship ("sentence" in linguistics), the user entity is the "subject" while the "object" is the part which the user is interested in. The "verb" and "object" part together are known as the predicate.

Figure 6:
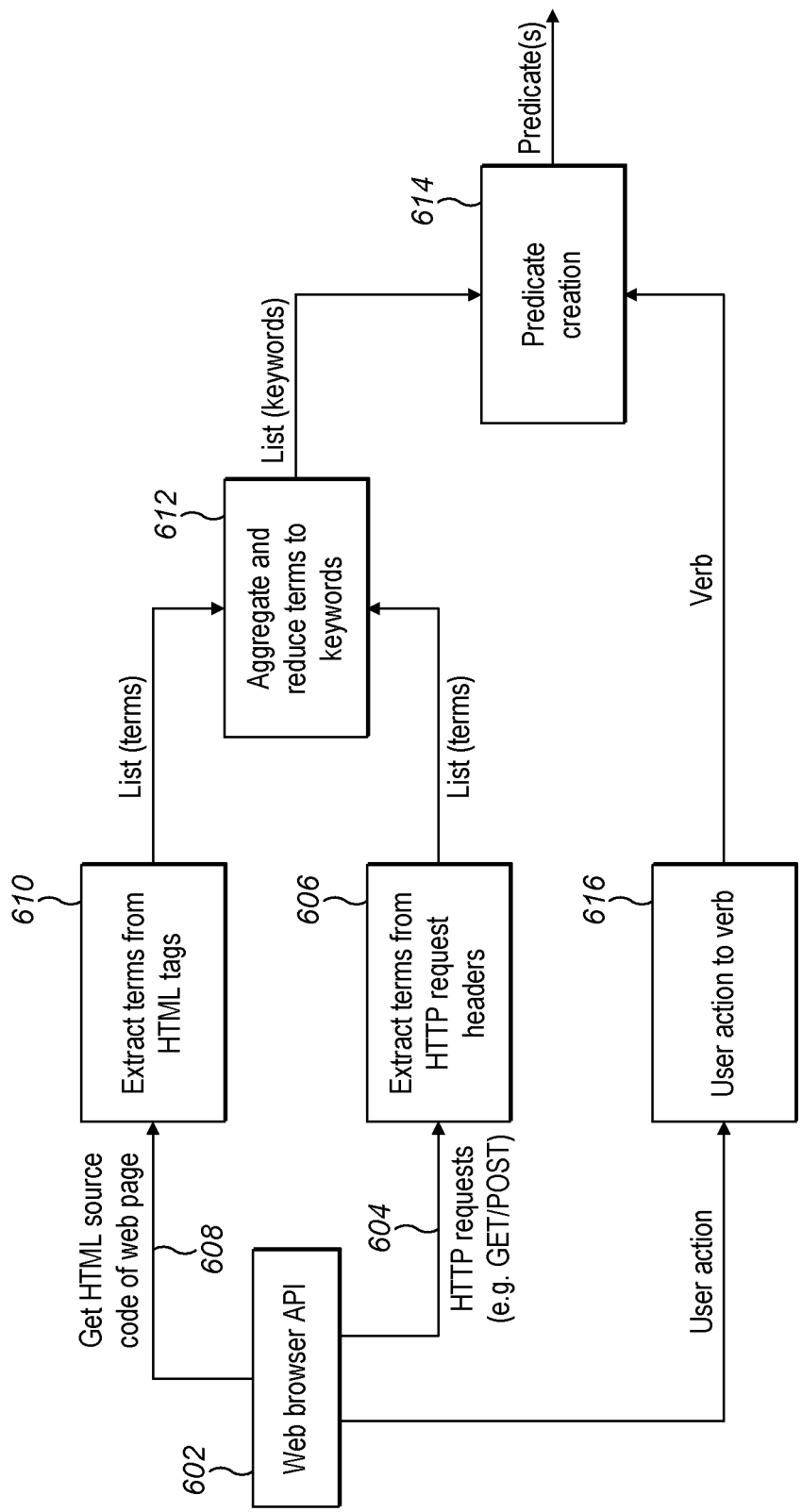
FIG. 6 illustrates a part of the method of FIG. 4.

FIG. 6 illustrates the process of obtaining information about areas of interest to the user, and more specifically the process of extracting the predicate from an HTTP request that originates from the web browser 302.

As described above, and specifically with reference to FIG. 5, the process is triggered by an outgoing HTTP request, i.e. an HTTP request generated by the web browser 302 in response to some user input.

The HTTP Analyser 308 obtains information from an application programming interface (API) 602 of the web browser 302.

In some cases, the relevant information can be obtained directly from the HTTP request 604 that was generated. It is not necessary to examine all of the request, just the request line and specifically the resource that is requested, and the Host header field.

For example, the HTTP request may take the form:
GET /the-institute/ieee-news/whats-in-store-for-national-engineers-week
Host: spectrum.ieee.org In another example, the HTTP request may take the form:
GET /usb-drives/UsbKey-G100
Host: www.StorageCo.com In these cases, as shown at 606, the message header contains a domain name that has a meaning. Thus, in the first example given above, it is possible to determine that the user has shown an interest in National Engineers' Week. In the second example given above, it is possible to determine that the user has shown an interest in a specific USB drive available from the company StorageCo.

In some other examples, the message header may not have a readily understandable meaning.

Figure 7:
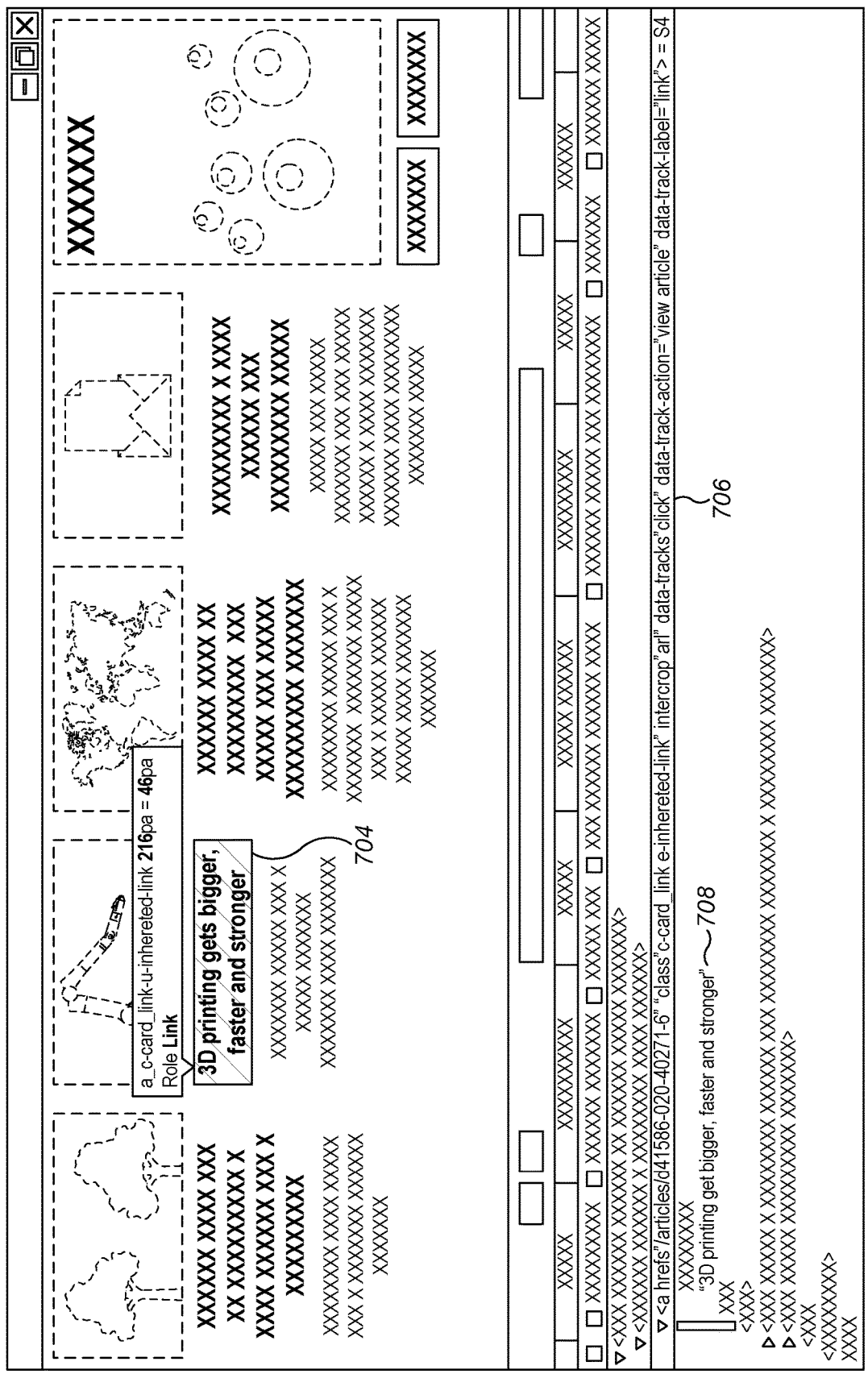
FIG. 7 illustrates a part of the method of FIG. 4.

This is illustrated in FIG. 7, which shows a part 702 of the website of "Nature" magazine, www.nature.com, where one specific article 704, with the title "3D printing gets bigger, faster and stronger", has been highlighted. In this case, the resource on the request line of the message header of the HTTP request relating to that article is '/articles/d41586-020-002171-6', as shown at 706 in FIG. 7. Although this indicates that the user's interest is an article, it does not reveal anything about the content of the article.

However, in this case, it is still possible to find a hypertext markup language (HTML) description of the content that the user has interacted with, by looking at the HTML source code of the relevant web page, as shown at 608 in FIG. 6. In many cases, the content that the user has interacted with is encapsulated in HTML 'tags' that can provide information about the content. Typically, the <a> tag encapsulates this content.

Thus, FIG. 7 shows the <a> tag 708 associated with the highlighted article 704 that is identified by the user in this case. Specifically, the <a> tag includes the article title "3D printing gets bigger, faster and stronger", and thus reveals that the article is about 3D printing. This method provides relevant information when the user has clicked on a hyperlink (either text or an image, where an image typically has an <img> tag embedded in the <a> tag), which is a common action in use of a web browser Thus, relevant information can be obtained from the user's actions, either by examining the HTTP request 604, or by examining HTML tags in HTML source code 608 associated with the requested resource, or both.

In both cases, the data are tokenized into lists of terms, e.g. by splitting them on backslash, dot or space. For example, the title "3D printing gets bigger, faster and stronger" becomes a list of terms [3D, printing, becomes, bigger, faster, stronger]. In another example mentioned above, '/usb-drives/UsbKey-G100' becomes a list of terms [usb-drives, UsbKey-G100].

Once lists of terms are retrieved, they are reduced to objects that can be included in the predicate, as shown at block 612 in FIG. 6. This process includes the steps of removing "alphanumerics" that do not resemble words or product numbers (such as the d41586-020-002171-6 from the example above), removal of prepositions (such as "from" word), conjunctions (e.g. "and"), etc. Next, the terms are aggregated together to remove redundant terms. The aggregation process may include removal of redundant terms that are not lexicographically similar, but are semantically similar (e.g. using a thesaurus).

This generates a list of keywords, and these can be constructed as predicates, as shown at block 614 in FIG. 6.

The list can be hierarchical, e.g "usb-drives", "UsbKey-G100", where the "UsbKey-G100" is an example of "usb-drives". The hierarchy may be based on the resource description of the HTTP Request line, but can also be constructed with the host name on top, e.g. StorageCo->usb-drives->UsbKey-G100.

In addition to extracted keywords, the browser provides a description of the user action that triggered the HTTP request, as shown at block 616 in FIG. 6. For example, this may show that the user performed a search action or a click action.

The predicate can be created from this information.

FIG. 8 illustrates the result of a part of the method of FIG. 4. Specifically, FIG. 8 shows the predicate 802 constructed based on the example discussed above.

Thus, FIG. 8 shows that the user clicked on a link to information about the UsbKey-G100, which is a usb-drive, owned by the company StorageCo.

FIG. 8 illustrates that the hierarchical relationships in the resource description of the HTTP request line are translated in the predicate 802, indicating that the UsbKey-G100 "is-a" usb-drive. In addition, the host name "StorageCo" is translated as a "has_owner".

FIG. 9 illustrates the result of this part of the method of FIG. 4 in another embodiment.

Specifically, FIG. 9 shows a further type of predicates 902. This contains the same information as the predicate 802 described with reference to FIG. 8, namely that the user clicked on a link to information about the UsbKey-G100, which is a usb-drive, owned by the company StorageCo.

The predicate 902 also includes information retrieved from the web browser's history via the browser API 602 shown in FIG. 6, concerning the number of times that the user repeated the action. Thus, in FIG. 9, it is shown that the user clicked on a link to such information 50 times, with the relevant dates (and possibly also times) shown at 904. Thus, for actions that have been repeated, the web browser can create a historical record, which can be displayed on the graph 902.

Figure 10:
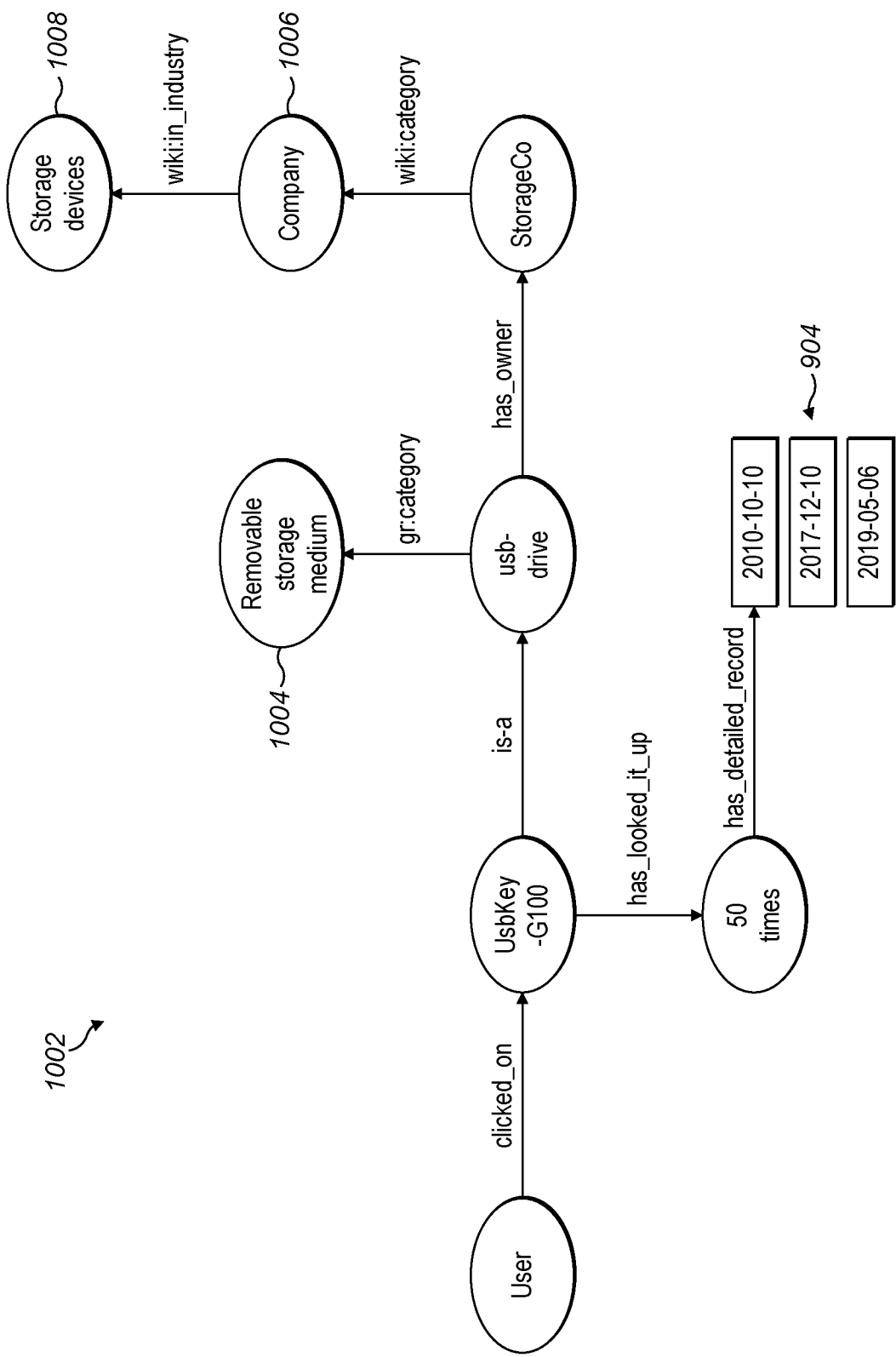
FIG. 10 illustrates a part of the method of FIG. 4 in another embodiment.

FIG. 10 illustrates the result of this part of the method of FIG. 4 in another embodiment, in which the sematic graph is updated with information obtained from external reference sources.

Thus, FIG. 10 shows a further type of predicate 1002. This contains the same information as the predicate 902 described with reference to FIG. 9, namely that the user clicked 50 times on a link to information about the UsbKey-G100, which is a usb-drive, owned by the company StorageCo.

The predicate 1002 also includes information obtained from external reference sources about components of the predicate 1002.

Thus, at 1004, it is shown that a usb-drive is a type of removable storage medium. For example, this information can be obtained from an online encyclopedia.

In addition, at 1006, it is shown that StorageCo is a company, and at 1008 it is shown that StorageCo is a company that makes storage devices. For example, this information can be obtained from a company register.

As mentioned above, in some embodiments, the semantic graph can be stored in a database, that is, for example, in the HA Store 314 shown in FIG. 3. In such embodiments, the comparison performed at step 522 of FIG. 5 can be done directly on the graph.

In other embodiments, the machine-generated representation of the areas of interest to the user can take the form of a trained machine learning (ML) model. The model can be trained with the message headers of the HTTP requests as the inputs, allowing the model to output the user interest as its output. For example, a Convolutional Neural Network (CNN) can be used, as CNNs are often used for text classification. Specifically, the text in this case is the keywords. Thus, in the example described above, "StorageCo", "usb", "flash", "drive", and "G100" may be keywords. The output may take the form of two "classes", with one pertaining to areas of user interest and one to area of no interest to the user.

So, if the keywords in retrieved data traffic are interesting to the user, then the confidence on the first and second "classes" would be high.

It should also be noted here that the keyword extraction process applies not only to initial processing of HTTP requests by the HA Endpoint 312, but also to subsequent requests, if the user is performing an action that includes a sequence containing many requests.

Figure 11:
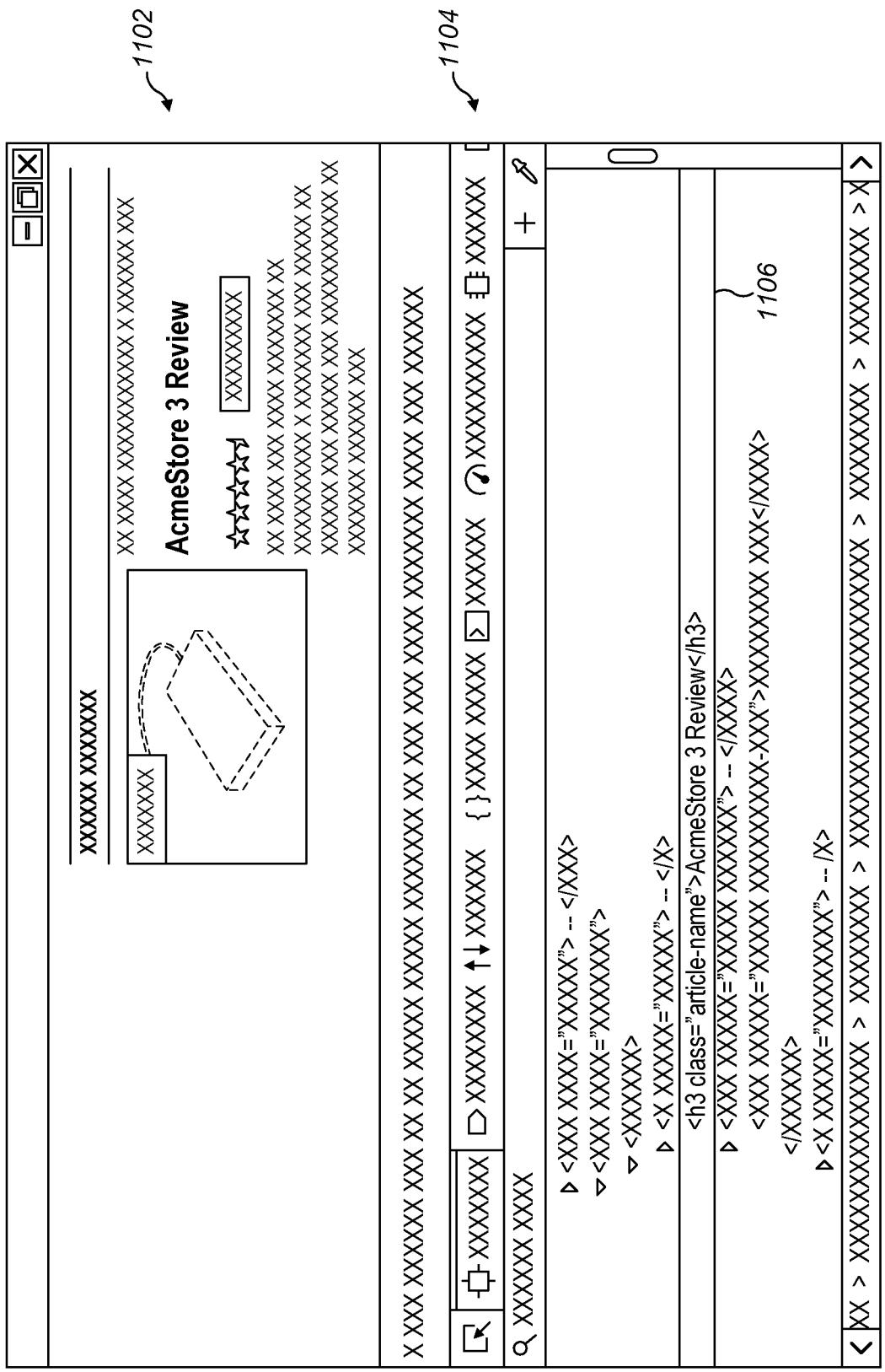
FIG. 11 illustrates a part of the method of FIG. 4 in another embodiment.

FIG. 11 illustrates a part of the method of FIG. 4 in another embodiment.

Specifically, when data traffic sent to the user is received by the HTTP analyser 308, the received data traffic can be filtered, based on the semantic graph.

FIG. 11 shows one example of data traffic that may be sent to the user, in the form of a part of a web page 1102. FIG. 11 also shows a part of the HTML code 1104 associated with the web page 1102. Specifically, FIG. 11 shows a part of the <div> divider tag, and specifically shows that the <h3> tag (header) 1106 contains the keywords "AcmeStore 3 . . . SSD".

It is possible to determine that an SSD is a storage device, and thus, in the example shown in FIG. 10, where the semantic graph 1002 indicates that the user is interested in removable storage media, it can be determined that this content is of interest to the user.

Figure 12:
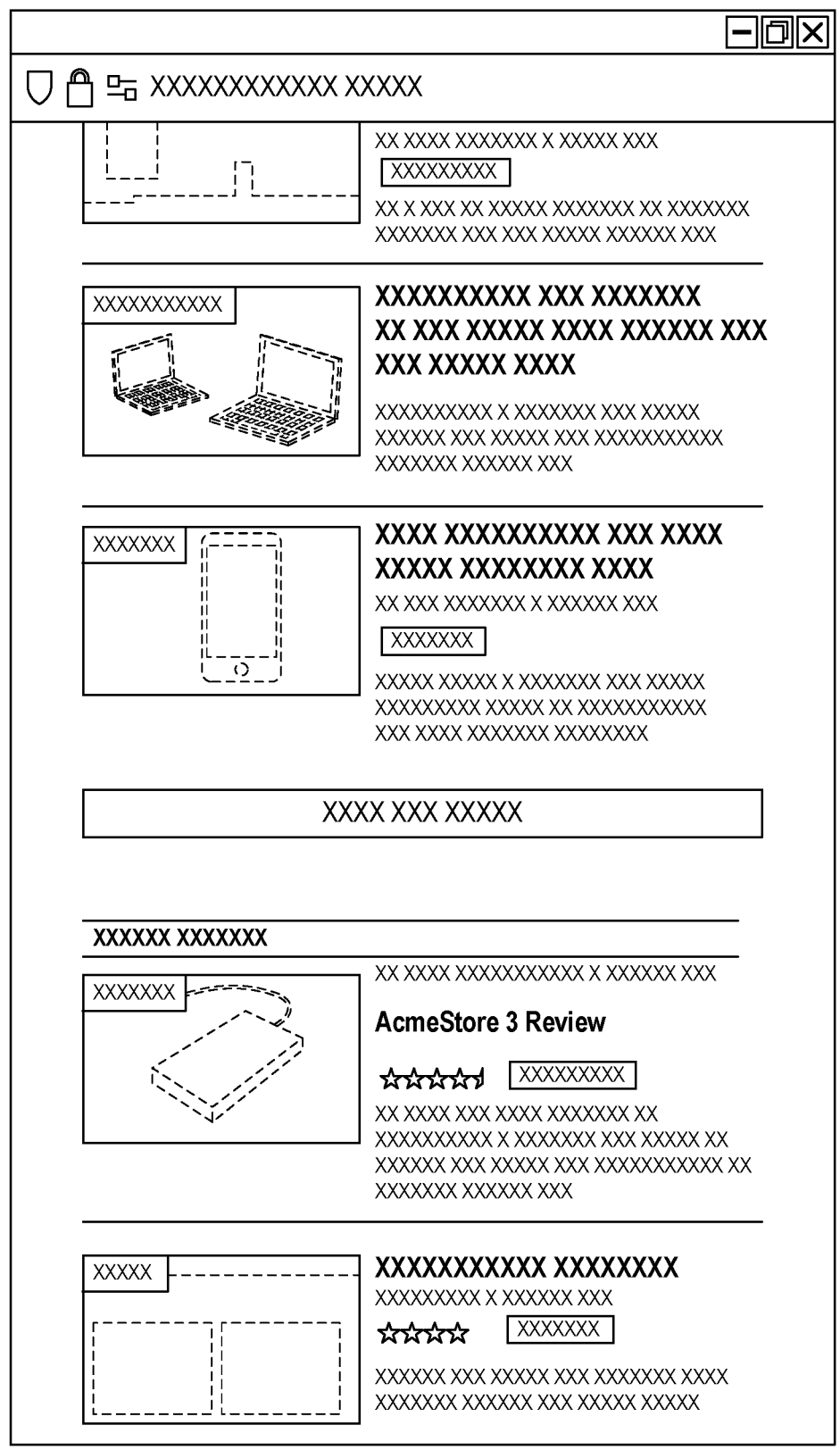
FIG. 12 illustrates received data traffic sent to the user.
Figure 13:
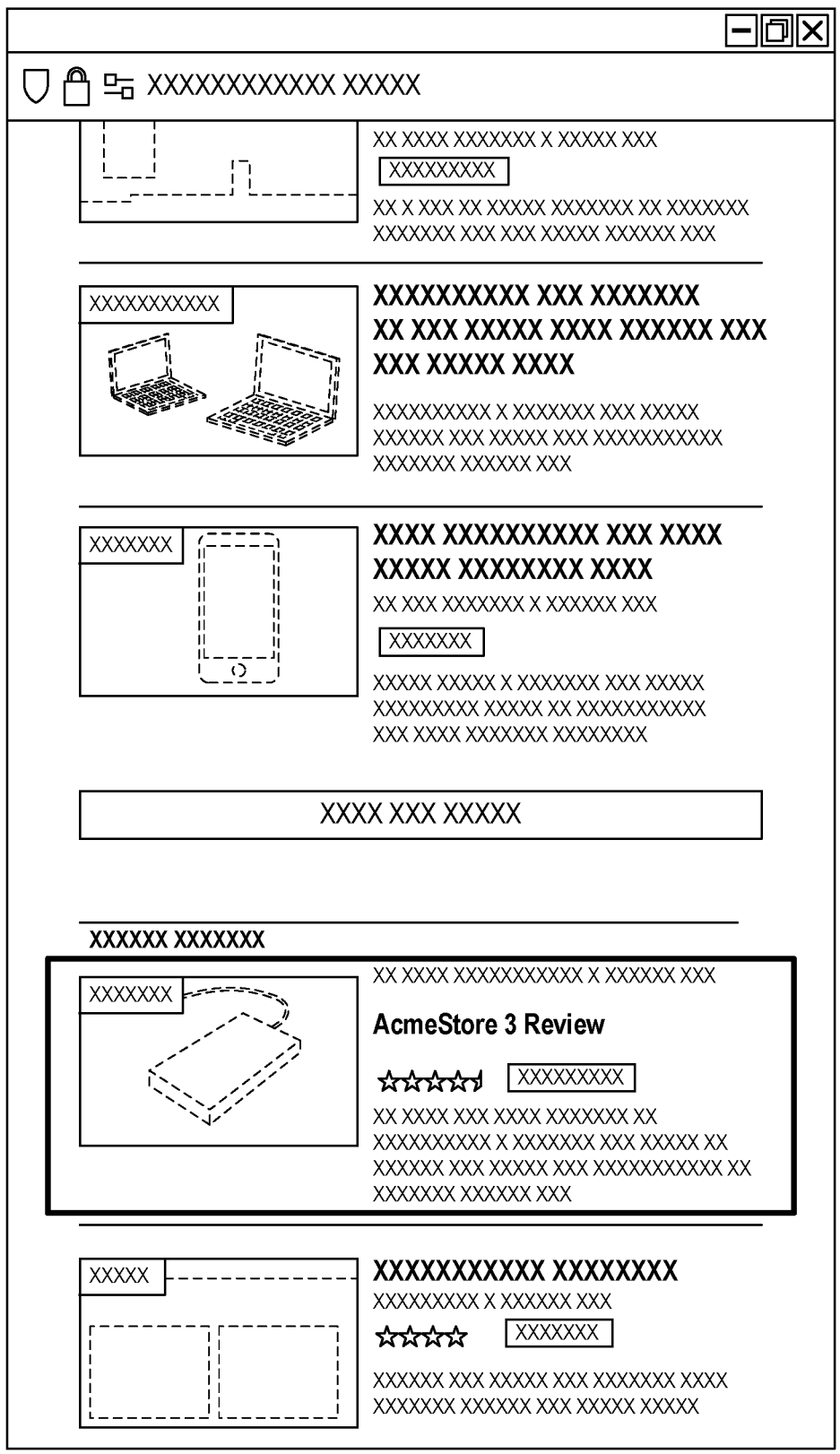
FIG. 13 illustrates filtered received data traffic in one embodiment.

Thus, FIG. 12 shows how the received data traffic would be presented by the web browser to the user without filtering, while FIG. 13 shows how the received data traffic would be presented by the web browser to the user after filtering. Specifically, as shown at 1302, the content relating to the "AcmeStore 3 . . . SSD" has been highlighted by drawing a box around it.

In other embodiments, content that is determined to be of interest to the user may be highlighted by changing the font size, or colour, or by bringing that content to the front, etc.

In other embodiments, the data traffic may be filtered such that information that is contained in the received data traffic may be replaced by information that is relevant to an area of interest of the user before the data traffic is presented to the user by the web browser. In other embodiments, the data traffic may be filtered such that information that is not relevant to an area of interest of the user is removed before the data traffic is presented to the user by the web browser.

In other embodiments, as described above, it is also possible to follow a trail of HTTP requests (either user triggered or automatically triggered by the web browser), in order to obtain information about areas of interest to the user. For example, in the case where the user is visiting a website of an online retailer, it is possible to establish from the HTTP requests sent by the user that an item has been bought. For example, the HTTP requests may relate to links to a specific product, and to "Add to shopping cart" or the like, "Go to checkout" or the like, and so on.

Based on the HTTP requests, therefore, it is possible to determine that a specific product has been bought. The semantic graph such as that shown in FIG. 8, 9, or 10 can therefore be updated to indicate that the user "has bought" a product, and can also indicate how many times a user as bought such a product.

Depending on the product category, this may mean that information (for example advertisements) relating to that specific product may be filtered before presentation to the user. For example, if a specific product has been purchased, it may be inferred that the user will no longer be interested in advertisements for that product, and information relating to that product may be removed or deprioritized before presentation to the user. However, for other types of product, for example consumables, it may be inferred that the user will need to make a repeat purchase, and so information relating to such products may be made more prominent at intervals, with the interval depending on when the previous purchase might be presumed to have been consumed.

There is thus described a method and system for scanning a user's web history by intercepting hypertext transfer protocol (HTTP) message headers, building a preference index based on this data and using this preference index locally on the user's device for filtering content based on its relevance to the user's interest or preferences.

In another embodiment, there is provided a computer program product comprising a computer readable medium, the computer readable medium having computer readable code embodied therein, the computer readable code being configured such that, on execution by a suitable computer or processor, the computer or processor is caused to perform any of the embodiments of methods described herein, such as embodiments of the methods described above in respect of FIGS. 4 and 5.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of operation of a user device, the method comprising, in the user device:
    intercepting Hypertext Transfer Protocol (HTTP) requests outgoing from the user device;
    obtaining information from the HTTP requests about areas of interest to a user of the user device;
    combining the information about the areas of interest, to generate a machine-generated representation of the areas of interest;
    receiving data traffic sent to the user device; and
    modifying the received data traffic, based on the machine-generated representation of the areas of interest.

2. The method according to claim 1, wherein obtaining the information about the areas of interest comprises obtaining information from message headers of the HTTP requests.

3. The method according to claim 2, wherein the information obtain from the message headers is Uniform Resource Identifiers (URIs) specified in the message headers.

4. The method according to claim 1, wherein obtaining the information about the areas of comprises obtaining Hypertext Markup Language (HTML) descriptions of resources identified by Uniform Resource Identifiers contained in message headers of the HTTP requests.

5. The method according to claim 1, wherein modifying the received data traffic comprises modifying the received data traffic to highlight information relevant to an area of interest of the user, for presentation to the user via a web browser running on the user device.

6. The method according to claim 1, wherein modifying the received data traffic comprises removing information from the received data traffic that is not relevant to an area of interest of the user, for presentation to the user via a web browser running on the user device.

7. The method according to claim 1, wherein modifying the received data traffic comprises replacing at least a portion of the received information with information that is relevant to an area of interest of the user, for presentation to the user via a web browser running on the user device.

8. The method according to claim 1, wherein the machine-generated representation of the areas of interest comprises a semantic graph generated based on the obtained information about the areas of interest.

9. The method according to claim 8, wherein the semantic graph describes hierarchical relationships.

10. The method according to claim 8, wherein the semantic graph contains information identifying user actions that triggered the HTTP requests.

11. The method according to claim 8, wherein the semantic graph is updated with information relating to a history of said HTTP requests.

12. The method according to claim 11, wherein the semantic graph supports inferences that given information is no longer relevant to one or more of the areas of interest.

13. The method according to claim 8, wherein the semantic graph is updated with information obtained from external reference sources, relating to the information obtained from the HTTP requests.

14. The method according to claim 8, wherein the semantic graph is updated by machine learning.

15. The method according to claim 1, wherein the machine-generated representation of the areas of interest comprises a machine learning model trained by classifying the machine learning model based on the obtained information about areas of interest.

16. The method according to claim 15, wherein the machine learning model is a feedforward neural network model.

17. The method according to claim 1, wherein the data traffic sent to the user device is sent in response to one or more of the HTTP requests.

18. A user device comprising:
    a processor; and
    a memory storing computer program instructions that when executed by the processor, configure the user device to:
        intercept Hypertext Transfer Protocol (HTTP) requests outgoing from the user device;
        obtain information from the HTTP requests about areas of interest to a user of the user device;
        combine the information about the areas of interest to generate a machine-generated representation of the areas of interest;
        receive data traffic sent to the user; and
        modify the received data traffic, based on the machine-generated representation of the areas of interest.

* * * * *